United States Patent [19]
Peter-Hoblyn et al.

[11] Patent Number: 5,976,475
[45] Date of Patent: *Nov. 2, 1999

[54] REDUCING NO$_X$ EMISSIONS FROM AN ENGINE BY TEMPERATURE-CONTROLLED UREA INJECTION FOR SELECTIVE CATALYTIC REDUCTION

[75] Inventors: Jeremy D. Peter-Hoblyn, Cornwall, United Kingdom; Eric N. Balles, Carlisle, Mass.; John E. Hofmann, Naperville, Ill.; Theodore J. Tarabulski, Brewster, N.Y.

[73] Assignee: Clean Diesel Technologies, Inc., Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/831,209

[22] Filed: Apr. 2, 1997

[51] Int. Cl.$^6$ ..................................................... B01D 47/00
[52] U.S. Cl. ...................... 423/212; 423/239.1; 423/235
[58] Field of Search ................................ 423/235, 239.1, 423/212; 422/168; 239/124, 125, 128

[56] References Cited

U.S. PATENT DOCUMENTS

| | | | |
|---|---|---|---|
| 2,540,663 | 2/1951 | Garey | 299/121 |
| 4,107,272 | 8/1978 | Mori et al. | 423/239 |
| 4,138,469 | 2/1979 | Kato et al. | 423/239 |
| 4,268,488 | 5/1981 | Ginger | 42/239 |
| 4,393,031 | 7/1983 | Henke | 423/239 |
| 4,842,834 | 6/1989 | Burton | 423/235 |
| 4,891,050 | 1/1990 | Bowers et al. | 44/67 |
| 4,892,562 | 1/1990 | Bowers et al. | 44/67 |
| 4,964,471 | 10/1990 | Michalik et al. | 169/57 |
| 4,997,631 | 3/1991 | Hofmann et al. | 423/235 |
| 5,021,227 | 6/1991 | Kobayashi et al. | 423/212 |
| 5,034,020 | 7/1991 | Epperly et al. | 44/358 |
| 5,139,754 | 8/1992 | Luftglass et al. | 423/235 |
| 5,184,462 | 2/1993 | Schatz | 60/274 |
| 5,189,876 | 3/1993 | Hirota et al. | 60/286 |
| 5,209,061 | 5/1993 | Takeshima | 60/278 |
| 5,215,652 | 6/1993 | Epperly et al. | 208/140 |
| 5,247,909 | 9/1993 | Simmons | 123/1 A |

(List continued on next page.)

FOREIGN PATENT DOCUMENTS

| | | |
|---|---|---|
| 1100292 | 5/1981 | Canada . |
| 210392 | 2/1987 | European Pat. Off. . |
| 0487 886 A1 | 6/1992 | European Pat. Off. . |
| 0 615 777 A1 | 2/1994 | European Pat. Off. . |
| 2-191258 | 7/1990 | Japan . |
| 92/02291 | 2/1992 | WIPO . |
| 97/01387 | 1/1997 | WIPO . |

OTHER PUBLICATIONS

Hultersman, R.J.; A Selective Catalytic Reduction of NOx From Diesel Engines Using Injection of Urea; Proefschrift Technische Universiteit Delft; Sep. 1995.

Havenith, Cornelis, Verbeek, Ruud P. "Transient Performance of a Urea deNOx Catalyst for Low Emissions Heavy– Duty Diesel Engines"; SAE Paper No. 970185, International Congress & Exposition, Detroit, MI; Feb. 24–27, 1997.

*Primary Examiner*—Thomas Dunn
*Attorney, Agent, or Firm*—St. Onge Steward Johnston & Reens LLC

[57] ABSTRACT

A safe, reliable SCR system for reducing NO$_x$ emissions from a lean-burn internal combustion engine utilizes urea in aqueous solution. Overheating and hydrolysis of the solution are prevented by maintaining the temperature of the urea solution sufficiently low that it is not permitted sufficient time at elevated temperature to hydrolyze the urea to such an extent that solids precipitate. In a preferred embodiment, an injector system similar to those used for fuel injection provides a constant feed to injectors and a return line. The feed and injection can be controlled to provide sufficient urea for NO$_x$ reduction and sufficient cooling capacity for the feed and injection system to avoid hydrolysis and deposits of hydrolysis products.

10 Claims, 1 Drawing Sheet

U.S. PATENT DOCUMENTS

| | | | |
|---|---|---|---|
| 5,260,042 | 11/1993 | Martin | 423/235 |
| 5,266,083 | 11/1993 | Peter-Hoblyn | 44/358 |
| 5,281,403 | 1/1994 | Jones | 423/235 |
| 5,431,893 | 7/1995 | Hug et al. | 423/234.1 |
| 5,522,218 | 6/1996 | Lane et al. | 60/274 |
| 5,620,142 | 4/1997 | Elkas | 239/518 |
| 5,753,188 | 5/1998 | Shimoda et al. | 442/108 |

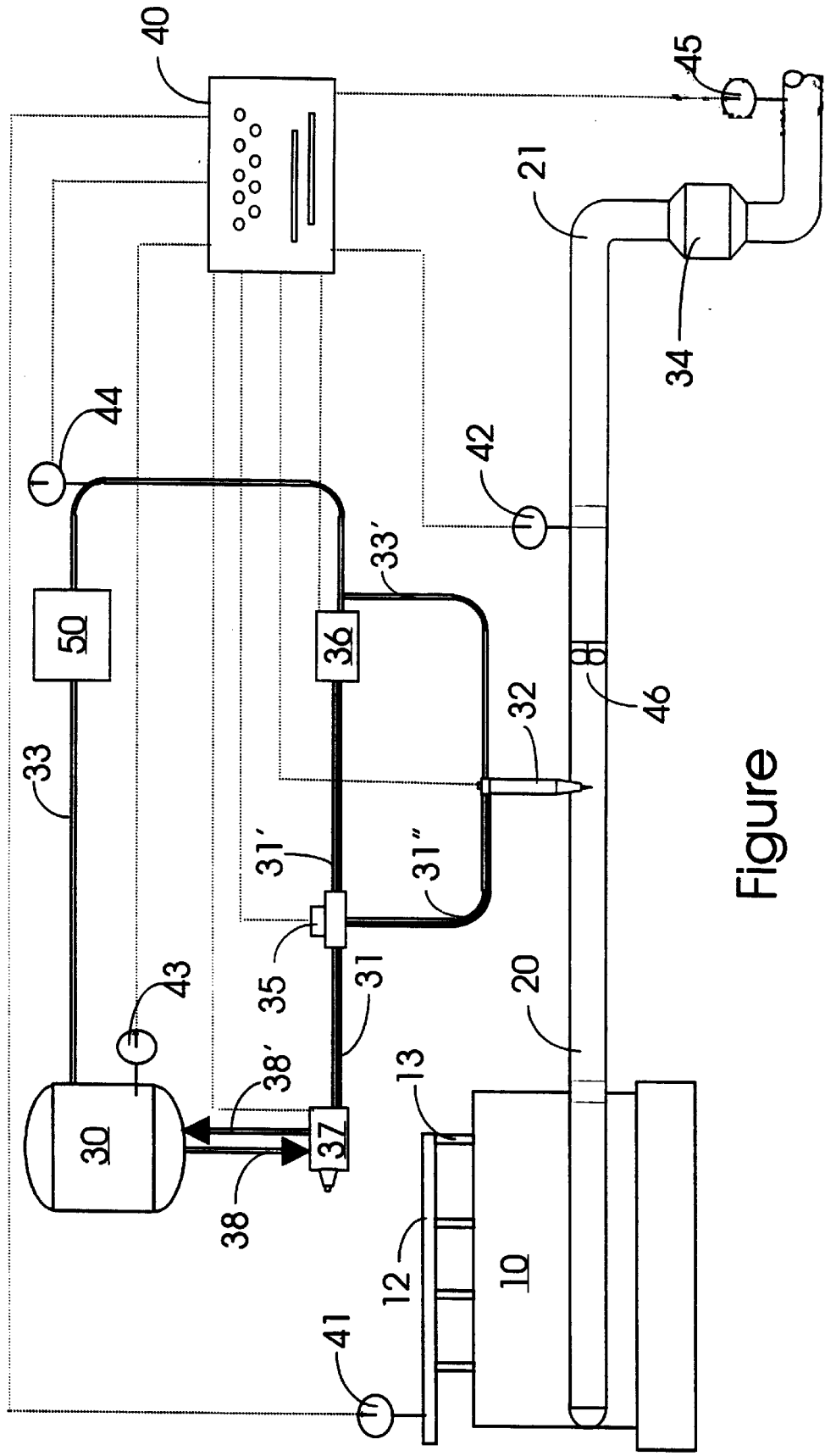
Figure

REDUCING NO$_x$ EMISSIONS FROM AN ENGINE BY TEMPERATURE-CONTROLLED UREA INJECTION FOR SELECTIVE CATALYTIC REDUCTION

TECHNICAL FIELD

The invention relates to means and methods that enable the safe and reliable reduction of nitrogen oxides (NO$_x$) emissions while permitting a diesel or other lean-burn engine to operate efficiently.

Diesel and lean-burn gasoline engines provide advantages in fuel economy, but produce both NO$_x$ and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase NO$_x$.

Current and proposed regulations challenge manufacturers to achieve good fuel economy and reduce particulates and NO$_x$. Lean-burn engines will be necessary to achieve the fuel economy objective, but the high concentrations of oxygen in the exhaust renders typical exhaust gas catalyst systems ineffective for reducing NO$_x$.

SCR (selective catalytic reduction) has been available for years in some contexts for reducing NO$_x$. To date, however, SCR has depended on the use of ammonia, which has safety problems associated with its storage and transport. Urea is safer, but has not been practical for many SCR applications—particularly mobile NO$_x$ sources—due to the difficulty in converting it from a solid or an aqueous form to its active gaseous species, typically NH$_i$ and HNCO radicals.

There is a current need for a safe, economical and effective answer to the problems associated with SCR, particularly for mobile diesel and other lean-burn engines.

BACKGROUND ART

Where SCR catalysts are employed to limit NO$_x$ emissions from diesel engines, one has to deal with either the dangers of ammonia or risk fouling the catalysts under most conditions. In this regard, see R. J. Hulterman; A Selective Catalytic Reduction Of NO$_x$ from Diesel Engines Using Injection Of Urea; Ph.D. thesis, September 1995. Hulterman describes a number of technical challenges including clogging of atomizers, decomposition problems and system dynamics. Similarly, in SAE Paper No. 970185, entitled "Transient Performance of a Urea DeNOx Catalyst for Low Emissions Heavy-Duty Diesel Engines", it is indicated that the injection nozzles must protected from undue heat.

The limited attempts to use urea SCR for diesel engines have required the use of large pyrolization chambers or other devices following the point of urea introduction into the exhaust, as disclosed in U.S. Pat. No. 5,431,893, to Hug, et al. Equipment of this type highlights the known problems with urea. Once introduced into diesel exhaust, urea takes time to break down and may cause nozzle plugging as conventionally introduced and still as proposed in that disclosure. To protect the catalyst from fouling, Hug, et al., propose bulky equipment. In addition, this disclosure highlights the necessity of maintaining the urea solution at a temperature below 100° C. to prevent decomposition prior to passage through the nozzle. They propose the use of moderate urea pressures when feeding the urea and find it necessary to have alternative means to introduce high-pressure air into the feed line when it becomes plugged. The nozzles employed by Hug, et al., are apparently capable of producing moderately-fine sprays, the dispersion of which is aided by auxiliary air, but the droplets are still large enough to require a large pyrolization channel. See also, WO 97/01387 and European Patent Application 487,886 A1.

Each of the points of caution by these references about the difficulties of using urea with SCR systems, especially for mobile sources, points to the trouble the art has had and continues to have.

The art is awaiting the development of a process and apparatus that would permit the use of urea in an SCR process simply, reliably, economically and safely.

DISCLOSURE OF INVENTION

It is an object of the invention to provide a safe, reliable SCR system for reducing NO$_x$ emissions from an internal combustion engine.

It is another object of the invention to eliminate the safety problems associated with the storage and handling of ammonia for mobile uses.

It is still another object of the invention to enable the use of urea for SCR NO$_x$ reduction without plugging of feed lines due to hydrolysis of the urea.

It is yet another object of the invention to enable a use of urea for SCR that avoids wetting of or solids deposition on the catalyst.

It is another, more specific, object of one aspect of the invention to provide a simple, robust, SCR system capable of rapid response time in order to meet transient conditions prevailing in diesel engines.

It is a yet further and more specific object of the invention to enable the use of urea in an SCR system that enables treatment of exhaust gas at temperatures between 180 and 650° C.

It is a yet further and more specific object of the invention to enable the use of urea in an SCR system that enables integration with an engine management system (EMS), thereby avoiding the need for an extra controller.

It is yet another specific object of the invention to provide a simple mechanical device for accomplishing the above objects and preferably to enable close coupling of the reagent injection means and the SCR catalyst.

These and other objects are achieved by the present invention, which provides an improved method and apparatus for NO$_x$ reduction.

The method of the invention reduces the emissions of NO$_x$ from a lean-burn engine having associated therewith an exhaust system having an exhaust passage for carrying exhaust gases containing NO$_x$ to a reactor effective for selective catalytic NO$_x$ reduction, and in one embodiment comprises: feeding an aqueous urea solution from a storage vessel through a line to an injector; returning urea solution from the injector to the storage vessel, the rates of feed and return being sufficient to supply urea as needed to the exhaust gases for NO$_x$ reduction and maintain the temperature of the urea solution sufficiently low that it is not permitted sufficient time at elevated temperature to hydrolyze the urea to such an extent that solids precipitate (e.g., below about 140° C.); injecting urea solution into the exhaust gases at an exhaust gas temperature sufficient for SCR; and passing the exhaust gas through an SCR reactor.

In another embodiment, the return is not employed or is not the sole means for temperature maintenance of the urea solution. In this embodiment, a heat exchange fluid such as air or engine coolant can be passed in heat exchange contact with the injector. In this embodiment, the temperature of the urea solution can be allowed to rise above 100° C. as long as the urea solution is maintained at a pressure above the saturation vapor pressure at the temperature.

Among the preferred aspects of the method are the use of concentrated urea solutions, e.g., containing at least about 25% by weight urea. Preferably, urea is injected when the temperature of the exhaust gases is within the range of from about 180 to about 650° C.

The apparatus in one embodiment comprises: means for feeding an aqueous urea solution from a storage vessel through a line to an injector; means for returning urea solution from the injector to the storage vessel, the rates of feed and return being sufficient to supply urea as needed to the exhaust gases for $NO_x$ reduction and maintain the temperature of the urea solution sufficiently low that it is not permitted to sufficient time at elevated temperature to hydrolyze the urea to such an extent that solids precipitate (e.g., below about 140° C.); injector means for injecting urea solution into the exhaust gases at an exhaust gas temperature effective for SCR; and exhaust passage means leading from the injector means to an SCR reactor.

A preferred embodiment of the apparatus further includes: means to sense the temperature with the exhaust gas; means to generate a signal representative of the sensed exhaust gas temperature; means to sense engine load; means to generate a signal representative of the sensed engine load; means to sense the temperature with the urea solution; means to generate a signal representative of the sensed urea solution temperature; and means to compare the generated signals to reference values and generate control signals for controlling urea feed, injection and return.

BRIEF DESCRIPTION OF THE DRAWING

The invention will be better understood and its advantages more apparent from the following detailed description, especially when read in light of the accompanying drawings, wherein:

The FIGURE is a flow diagram showing principal components of one embodiment of the invention.

DETAILED DESCRIPTION OF A PREFERRED EMBODIMENT

In this description, the term "lean-burn engine" is meant to include engines that can be operated with an inlet oxygen concentration greater than the amount required for stoichiometric (or chemically correct) combustion of a hydrocarbon fuel, e.g., at least 1% by weight excess oxygen.

The term "engine" is meant in the broad sense to include all combustors which combust hydrocarbon fuels to provide heat, e.g., for direct or indirect conversion to mechanical or electrical energy. Internal combustion engines of the Otto, Diesel and turbine types, as well as burners and furnaces, are included and can benefit from the invention. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The term "urea" is meant to encompass urea in all of its commercial forms, including those containing: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine and tricyanourea. Typically, the commercial form of urea will consist essentially of urea, containing 95% or more urea or an aqueous solution containing urea of this purity.

Aqueous solutions of urea can be employed up to their solubility limits. Typically, the aqueous solution will contain from about 2 to about 65% reagent based on the weight of the solution. It is an advantage of the invention that it enables the use of concentrated urea solutions. The prior art has taught that dilute solutions of urea are necessary to avoid problems with precipitation of breakdown products. The invention enables utilizing urea to maximum advantage without the usual concerns of ammonia or the concerns of line and nozzle plugging. Concentrated solutions are preferred because they limit the amount of water that must be stored, transported, vaporized and protected from freezing in the winter. Typical concentrations of urea are within the range of from about 25 to about 50%, e.g. about 35%.

The urea can be stored in the form of a solution or dry in a canister. When stored dry, water is passed in contact with the urea as needed to prepare a solution. In this manner the solution concentration can be varied from near saturation (to minimize water storage and use) or to any concentration suitable for a vehicle or stationary installation. It will be desired in some circumstances to provide heaters for the water and/or urea solution storage to prevent freezing or to reduce time for gasification. Likewise, it may be useful to employ antifreeze materials.

Reference is made to the FIGURE, which illustrates in schematic form, one embodiment of the invention. Briefly, diesel engine 10 is fed fuel via lines 12 and injectors 13. The engine produces exhaust gases containing $NO_x$ that are passed through exhaust pipe 20. Urea solution is fed from vessel 30 to exhaust line 12 by one or more injectors, like 32. The exhaust gases are then passed through SCR reactor unit 34. The process is preferably controlled by means of a controller 40, which can be integrated with an engine management system (EMS), thereby avoiding the need for an extra controller. In an embodiment not shown the urea solution is introduced into the exhaust between exhaust valves of the engine and a turbocharger exhaust turbine.

The invention enables utilization of aqueous solutions of urea in place of ammonia for SCR $NO_x$ reduction in a manner that avoids plugging the solution feed and injector system with deposits of urea hydrolysis products or wetting or forming solid deposits on the catalyst.

The advantages related to preventing deposits in the reagent supply system, are achieved by assuring that hydrolysis does not occur in the feeding system. The advantage of preventing deposits on the catalyst is achieved by encouraging rapid decomposition of the urea after the solution is introduced into the exhaust gases. The fact that the invention does not rely on low urea concentration to avoid decomposition in the feed lines, increases the rate of decomposition of the urea in the exhaust. Moreover, the invention does not require the use of air to cool a dilute urea solution to under 100° C.—such low temperatures, especially when achieved by the use of large volumes of cool air introduced into the exhaust gases, can delay decomposition of the urea by the exhaust gases.

The FIGURE shows a reagent injector system employing a feed line, e.g., a common rail 31, with a return to the supply via spill line 33. This system maintains a continuous flow of reagent between storage vessel 30 and injector 32. The term injector is used herein to describe any device capable of controlling flow of urea solution from the rail 31 to the exhaust gases. The injector can be either a high-pressure or a low-pressure device.

Among the low-pressure devices are any of the available low-pressure liquid distribution means, such as a mechanical atomizer of the type employed to spray paints, a sonic atomizer, a simple valve extending to a tube with a dispersion device comprising a plurality of orifices to provide a fine spray, a pintle-controlled nozzle capable of adjustable spray patterns, or the like. Air-powered nozzles can be employed, but it is preferred to operate them with a minimum of air to reduce the cost of the equipment and the effect air has on cooling the exhaust. In circumstances where neither air supply nor its cooling effect are unacceptable design compromises, air can be employed to cool the injector and/or aid injection of urea solution.

Among the high-pressure injectors are injection devices of the type employed for fuel injection, which open abruptly at 1000 to 10,000 psig and have peak dynamic injection pressures up to abut 50,000 psig. Injectors of the pintle type operate within the aforementioned pressure ranges and may provide the added advantage of a scraping, self-cleaning feature to minimize injector deposits at the nozzle outlet. Other injectors can also be employed, regardless of operating pressure, e.g., some operating at pressures on the order of 30 psig.

In-line mixing means are preferably employed to assure good distribution of urea solution within the exhaust gases, especially when low-pressure injectors are employed. Distribution is important because high concentrations of urea solution can cause localized cooling and this can result in droplets of water or particles of urea or pyrolysis products surviving and then impacting the SCR catalyst One suitable device is shown as a propeller 46. Alternatively, a foraminous body, mist eliminator, static mixer, particulate trap or other like device having a mixing capability can be employed. The FIGURE also shows bend 21 in exhaust pipe 20, to act as a guard against liquid or solid urea or urea residues from contacting the catalyst in SCR reactor 34.

The embodiment illustrated in the FIGURE includes a rail pressure sensor 35 and a pressure-regulating valve 36. Pressure within the rail and return lines by valve 36 and pump 37, in response to control signals provided by controller 40. It will be noted that pressurized lines 31, 31' and 31" are shown in the FIGURE as darker than the unpressureized return lines 33 and 33'. Optionally, a heat exchanger 50 can be employed in line 33 to cool the urea solution in the case of overheating. Lines 38 and 38' between the pump 37 and vessel 30 provide agitation as needed to the urea solution.

Controller 40 is preferably integrated with an EMS for the engine 10 to avoid the need for several different controllers and to utilize existing wiring harnesses and sensors to the extent possible. Various sensors are shown and function to sense various operation parameters and generate operation signals representative of the sensed parameters. The operation signals are then sent to the controller, which compares them to reference values, computes one or more control signals and sends the control signals to one or more devices being controlled.

The FIGURE shows sensor 41 for engine, sensor 42 for exhaust gas temperature, sensor 43 for urea level in vessel 30, and sensor 44 for the temperature of the urea solution in return line 33. Engine load, as represented by one or more suitable parameters, such as fuel flow, engine speed, throttle position or injection system settings, is a key parameters, and one of these or like factor can be monitored to determine the amount of $NO_x$ being generated and the need for reagent feed to the heating unit or its hydrolysis products fed to the exhaust gases. Optional sensors, such as sensor 45 for residual $NO_x$ concentrations, can be employed for feedback control to the extent that such is practical. The FIGURE also shows in dotted lines operation signals being sent to the controller and control signals being sent to controlled devices.

The temperature of the urea solution throughout the system is maintained at a value sufficiently low that it is not permitted sufficient time at elevated temperature to hydrolyze the urea to such an extent that solids precipitate (e.g., below about 140° C.). The injector 32 will tend to heat up as the temperature of the exhaust gases rises after startup to within the range of from about 300° to about 650° C. at high load for some engines. Unless precautions are taken, the high temperature will cause hydrolysis of the urea before injection—causing the hydrolysis products to precipitate due to their lower solubility than urea. The invention circulates the urea solution continuously from vessel 30 through lines 31 and 33 (and associated lines, as controlled) to provide cooling to the injector. It is practical with suitable controls to let the temperature of the solution rise to between 105° C. and 130° C. when the system is pressurized to the saturated vapor pressure for the temperatures involved, Because the residence time on the spill line is short, the urea solution may be allowed to reach higher temperatures without reaching the solubility limit for hydrolysis products. An auxiliary heating means (not shown) can be employed in the vessel 30 or elsewhere in the feed or return system to achieve a desired temperature.

It is a distinct advantage of the invention that no air is required to achieve temperature control—saving on equipment costs and obviating reduced efficiency due to the cooling effect of the air on the exhaust gases. It is also an advantage of the invention that high-pressure injector equipment with a return line can be designed for operating pressures high enough to effect atomization, preferably with at least some gasification, of the urea solution upon release of pressure. This feature better enables close coupling of the injector with the SCR reactor 34.

In another embodiment, however, the return lines 33 and 33' are not employed or are not the sole means for temperature maintenance. In this embodiment, heat exchange fluid such as air or engine coolant can be passed in heat exchange contact with the injector. Permissibly, in this embodiment, the temperature of the urea solution can be allowed to rise above 100° C. as long as the urea solution is maintained at a pressure above the saturation vapor pressure at the temperature.

It is possible to provide a catalyst for promoting hydrolysis and/or pyrolysis of the urea as a coating on one or more of the exhaust system component parts or as a separate element. For example, it could be coated on the exhaust pipe 20, especially at bend 21. Also, it could be employed on the mixing device 46. Coatings of this type have a two-fold advantage of keeping the operating system clean and enhancing the gasification of the urea. Among suitable hydrolysis catalysts are ones that comprise a material selected from the group consisting of phosphoric acid and acid phosphates, alkali metal hydroxides and carbonates, such as sodium hydroxide, potassium hydroxide, sodium carbonate, potassium carbonate, alkali metal silicates, alkaline earth metal hydroxides and oxides, aluminum hydroxide and oxides, and mixtures of two or more of these. See also U.S. Pat. No. 4,997,631 to Hofmann, et al., PCT application WO 92/02291 to von Harpe, et al., U.S. Pat. No. 5,139,754, Hofmann, Sun and Luffglass, U.S. Pat. No. 5,281,403 to Jones and JP HEI 2-191,528 to Ebina for a further listing of catalysts and techniques. See also, EP 615,777, which discloses a mixed oxide catalyst of $Al_2O_3$-$TiO_2$-$SiO_2$-$ZrO_2$, capable of breaking down urea in diesel exhaust.

The SCR catalyst used is one capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220 to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori et al. in U.S. Pat. No. 4,107,272 discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. No. Pat. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent to which the urea has been introduced is preferably passed over the SCR catalyst while the effluent is at a suitably high temperature, typically between about 180° C. and about 650° C., e.g., at least about 300° C. In this manner, the active species present in the effluent due to hydrolysis and gasification of the urea solution most effectively facilitates the catalytic reduction of nitrogen oxides. The effluent will contain an excess of oxygen. Use of the present invention with any of the above SCR catalysts (the disclosure of which are specifically incorporated by reference) reduces or eliminates the requirement for the transport, storage and handling of large amounts of ammonia or ammonium water.

Because the invention is compatible with other emission-reducing and fuel economy technologies, a number of hybrid processes become available to the engine designer, vehicle producer and retrofit market. For example, the fuel can be catalyzed with a suitable platinum group metal additive and/or auxiliary catalyst composition selected from the group consisting of compounds of sodium, lithium, potassium, calcium, magnesium, cerium, iron, copper, manganese, and mixtures. Among the compounds are any of those disclosed for example in prior U.S. Pat. Nos. 4,892,562 and 4,891,050 to Bowers and Sprague, U.S. Pat. No. 5,034,020 to Epperly and Sprague, U.S. Pat. No. 5,215,652 to Epperly, Sprague, Kelso and Bowers, and U.S. Pat. No. 5,266,083 to Peter-Hoblyn, Epperly, Kelso and Sprague, WO 90/07561 to Epperly, Sprague, Kelso and Bowers, and U.S. patent application Ser. No. 08/597,517 filed Jan. 31, 1996, now abandoned by Peter-Hoblyn, Valentine and Sprague, hereby incorporated by reference. Where the application permits, a blend of these compounds can be used with one or more other platinum group metal compounds such as soaps, acetyl acetonates, alcoholates, β-diketonates, and sulfonates, e.g., of the type which will be described in more detail below.

The platinum group metal catalyst and/or other catalyst can be added in any manner effective for its intended purpose, such as by adding it to the fuel in bulk storage, to the fuel in a tank associated with the engine, or by continuous or intermittent addition, such as by a suitable metering device, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air.

When employed, particularly in combination with particulate traps, platinum group metal catalyst compositions are preferably employed at concentrations of less than 2 parts by weight of platinum group metal per million parts by volume fuel (ppm). For the purposes of this description, all "parts per million" figures are on a weight to volume basis, i.e., grams/million cubic centimeters (which can also be expressed as milligrams/liter), and percentages are given by weight, unless otherwise indicated. Auxiliary catalysts are employed at levels effective for their intended purpose, preferably at levels of from 1 to 100 ppm of the fuel utilized, e.g., 10 to 60 ppm.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

We claim:

1. A method for reducing the emissions of $NO_x$ from a lean-burn engine having associated therewith an exhaust system having an exhaust passage for carrying exhaust gases containing $NO_x$ to a reactor effective for selective catalytic $NO_x$ reduction, comprising:

feeding an aqueous urea solution from a storage vessel through a line to an injector;

returning urea solution from the injector to the storage vessel, the rates of feed and return being sufficient to supply urea as needed to the exhaust gases for $NO_x$ reduction and maintain the temperature of the urea solution sufficiently low that it is not permitted sufficient time to hydrolyze the urea to such an extent that solids precipitate prior to injection of the urea solution into the exhaust gases;

injecting urea solution into the exhaust gases at an exhaust gas temperature sufficient for SCR; and passing the exhaust gas through an SCR reactor.

2. A method according to claim 1 wherein the urea solution contains at least about 25% by weight urea.

3. A method according to claim 1 wherein the temperature of the exhaust gases is within the range of from about 180 to about 650° C.

4. A method according to claim 1 wherein the urea solution prior to injection is maintained at a temperature below about 140° C.

5. A method according to claim 1 wherein the urea solution is injected into the exhaust gases at a pressure of at least about 30 psi.

6. A method according to claim 1 wherein the urea solution prior to injection is heated in whole or in part by an auxiliary heating means.

7. A method according to claim 1 wherein the urea solution prior to injection is heated in whole or in part by heat transfer from the exhaust.

8. A method according to claim 1 wherein the urea solution is introduced into the exhaust between exhaust valves of the engine and a turbocharger exhaust turbine.

9. A method according to claim 1 wherein the urea is introduced into the exhaust in close-coupled relation with the SCR catalyst.

10. A method according to claim 1 wherein introduction of the urea solution into the exhaust is controlled by a controller integrated with an engine management system.

* * * * *